Nov. 24, 1953

J. E. COLLINS 2,660,459

PACKING MEMBER

Filed Dec. 9, 1948

INVENTOR.
JOHN E. COLLINS
BY
Hyde, Meyer, Baldwin & Doran
ATTORNEYS

Patented Nov. 24, 1953

2,660,459

UNITED STATES PATENT OFFICE 2,660,459

PACKING MEMBER

John E. Collins, Akron, Ohio

Application December 9, 1948, Serial No. 64,311

1 Claim. (Cl. 286—28)

This invention relates to a leak proof packing member, and particularly to a packing member of this character adapted for use to prevent leakage between relatively movable parts under fluid pressure conditions. It may be used, for example, with plunger valves controlling air or oil under pressure.

An object of the invention is to provide a packing device of novel character and improved pressure sealing properties.

Since, as will appear, in practically all of its applications my improved packing is of generally annular character, for convenience it will be hereinafter usually referred to as a packing ring.

While my invention is adapted for use as a pressure seal or packing ring between relatively slidable members, it will be described with special reference to its use as a packing ring in a plunger valve for a compressed air system. It should be specifically understood that this description, and the disclosure represented by the drawings, are merely exemplary, and not limiting, the scope of the invention being defined by the appended claim.

Figure 1:
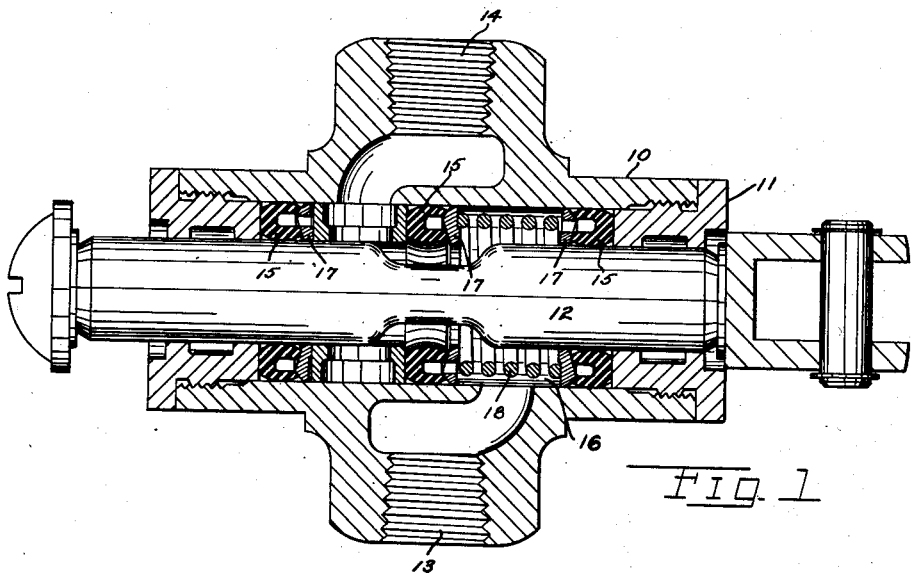
Fig. 1 is a vertical sectional view of a plunger valve assembly provided with packing rings embodying my invention.
Figure 2:
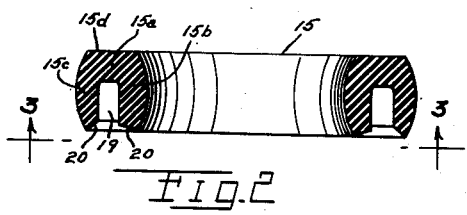
Fig. 2 is a sectional view, somewhat enlarged, showing the packing ring removed from the valve assembly.
Figure 3:
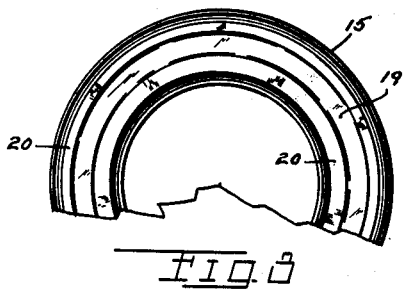
Fig. 3 is a view taken from the position of the line 3—3 of Fig. 2.

Referring now to Figs. 1 to 3, reference character 10 denotes a generally cylindrical tubular valve body provided with an end cap 11 which is centrally bored to receive a valve plunger 12. The body is provided with an intake port 13 and a discharge port 14, and it will be readily apparent to those skilled in the art that axial movement of the plunger to the left or right respectively establishes or cuts off fluid pressure communication between said intake and exhaust ports.

A plurality of my novel and improved packing rings 15 are disposed within the bore 16 of the valve body. The rings are preferably formed from resilient material such as natural or synthetic rubber. A spreader ring 17 is biased to contact with the front face of each packing ring by a spring 18. It will be understood that rings 15 are disposed wherever there is a possibility of undesired endwise leakage of fluid pressure.

Referring now to Figs. 2 and 3, each ring 15 has an annular slot 19 parallel to the axis thereof so as to provide a generally U-shaped packing defined by a rear wall 15a and a pair of forwardly extending lips 15b and 15c. In forming the slot the inner side walls which define the slot are generally parallel to each other and to the ring axis. The outer surfaces of the lips are of arcuate contour, concave outwardly, and in the embodiment shown said outer surfaces are arcs of closed curves which are not struck off from the same center. The tips 20 of the lips near the outer portion of slot 19 are beveled inwardly towards each other, and are complementary to the contacting face of spreader 17. The rear outer face 15d of end wall 15a may be, and here is, flat.

It will be apparent that packing ring 15 embodies the advantages of both the conventional O ring, and the prior U ring. All previous embodiments of the O ring have been unslotted, and all previous embodiments of the U ring have been so flexible that they accommodated themselves limply to the encompassing surfaces. The embodiment here shown and claimed which has opposed outer arcuate surfaces in the unrestrained condition seals by compression of the material of the ring itself and is also adapted to expand somewhat in the presence of fluid pressure so as to take up wear of the ring in extended use. The normal O ring seals only by compression of the material and its efficiency decreases as it wears. The conventional U type of packer seals under compression only.

Figure 4:
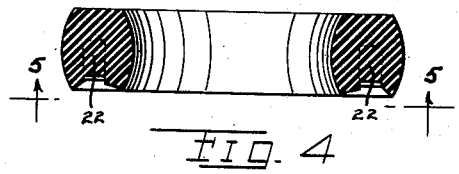
Fig. 4 is a view similar to Fig. 3 but showing a somewhat modified form of the invention.
Figure 5:
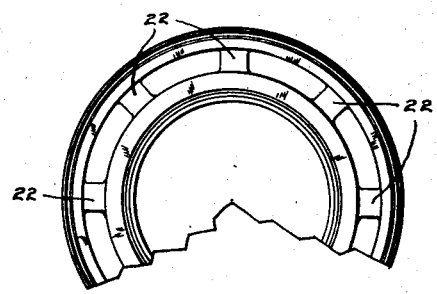
Fig. 5 is a view taken from the position of the line 5—5 of Fig. 4.

Figs. 4 and 5 show a somewhat modified form of the invention. In this embodiment a plurality of circumferentially spaced ribs 22 traverse the slot 23. The ribs stiffen the structure somewhat, and in a plunger valve such as illustrated in Fig. 1 they prevent turning over of one of the lips 20 as a result of the rush of fluid past the lip, if the packing ring happens to be in the path of fluid movement.

Figure 6:
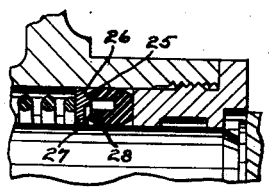
Fig. 6 is a fragmentary sectional view showing yet another embodiment of my invention.

Fig. 6 illustrates a somewhat modified embodiment of the ring. In the forms previously described with reference to Figs. 1 to 5 both of the lips 20 (Fig. 2) were inwardly convergent, the inclination of each being complementary to the inclination of the respective complementary mating faces of spreader 17. In the form shown in Fig. 6 the outer lip 25 is inclined to conform to the inclination of the mating face 26 of spreader 27, but the inner lip 23 is out of contact with the spreader so that its specific contour is relatively immaterial. The inner flange of the ring is free to be sealed by pressure through the valve only, there being no initial pressure from the spreader, and this reduces friction in sliding motion of the plunger.

What I claim is:

In a sealing structure of the type described, in combination, a packing ring having an annular slot parallel to the axis thereof so as to provide in transverse section a U-shaped packing defined by a rear wall and a pair of forwardly extending lips, the inner opposed surfaces of the lips lying in flat parallel planes when the packing ring is in unconfined condition, a plurality of ribs circumferentially spaced around the slot and transversely bridging the space between the slot walls, the outer surfaces of the lips being arcuate and outwardly convex in the same condition, the outer tips of the lips being beveled inwardly toward each other, a spreader ring having a beveled surface complementary with and in peripheral contact with the beveled surface of each lip, and resilient biasing means engaging at least one of said rings for forcing said beveled lip tips to diverge.

JOHN E. COLLINS.

References Cited in the file of this patent

UNITED STATES PATENTS

| Number | Name | Date |
|---|---|---|
| 685,818 | Close | Nov. 5, 1901 |
| 2,254,862 | Watson et al. | Sept. 2, 1941 |
| 2,281,671 | Brown | May 5, 1942 |
| 2,424,225 | Dick | July 22, 1947 |
| 2,465,175 | Schwarz et al. | Mar. 22, 1949 |
| 2,527,088 | Young | Oct. 24, 1950 |

FOREIGN PATENTS

| Number | Country | Date |
|---|---|---|
| 17,957 | Great Britain | of 1896 |
| 518,193 | Great Britain | of 1940 |
| 653,626 | Germany | of 1937 |